United States Patent
Im et al.

(10) Patent No.: US 9,383,850 B2
(45) Date of Patent: Jul. 5, 2016

(54) TOUCH SCREEN AND MANUFACTURING METHOD

(71) Applicant: BEIJING BOE OPTOELECTRONICS TECHNOLOGY CO., LTD., Beijing (CN)

(72) Inventors: Yun Sik Im, Beijing (CN); Yao Yu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 177 days.

(21) Appl. No.: 14/090,391

(22) Filed: Nov. 26, 2013

(65) Prior Publication Data

US 2014/0150253 A1 Jun. 5, 2014

Related U.S. Application Data

(62) Division of application No. 12/892,224, filed on Sep. 28, 2010, now Pat. No. 8,619,203.

(30) Foreign Application Priority Data

Sep. 30, 2009 (CN) .......................... 2009 1 0235617

(51) Int. Cl.
*G02F 1/1339* (2006.01)
*G06F 3/041* (2006.01)

(52) U.S. Cl.
CPC ............ *G06F 3/0412* (2013.01); *G02F 1/1339* (2013.01); *Y10T 29/49126* (2015.01)

(58) Field of Classification Search
CPC . G02F 1/13338; G02F 1/1339; G06F 3/0412; G06F 3/045; G06F 2203/04103
See application file for complete search history.

(56) References Cited

U.S. PATENT DOCUMENTS

| | | | |
|---|---|---|---|
| 6,369,865 B2 * | 4/2002 | Hinata | ............................ 349/12 |
| 2004/0222974 A1 | 11/2004 | Hong et al. | |
| 2006/0097991 A1 | 5/2006 | Hotelling et al. | |

(Continued)

FOREIGN PATENT DOCUMENTS

| | | |
|---|---|---|
| CN | 101206330 A | 6/2008 |
| CN | 101315483 A | 12/2008 |

(Continued)

OTHER PUBLICATIONS

USPTO RR dated Apr. 1, 2013 in connection with U.S. Appl. No. 12/892,224.
USPTO NFOA dated May 21, 2013 in connection with U.S. Appl. No. 12/892,224.
USPTO NOA mailed Sep. 5, 2013 in connection with U.S. Appl. No. 12/892,224.

*Primary Examiner* — Richard Kim
*Assistant Examiner* — Kendrick Hsu
(74) *Attorney, Agent, or Firm* — Ladas & Parry LLP (57) ABSTRACT

A touch screen comprises a first substrate, a second substrate and a third substrate sequentially stacked. A first sensing layer is provided on a first surface of the second substrate opposing to the third substrate, and a second sensing layer is provided on a surface of the third substrate opposing to the second substrate. The second substrate provided with the first sensing layer and the third substrate provided with the second sensing layer constitute a touch unit for sensing a touch signal, and the second substrate and the first substrate constitute a display unit for displaying.

17 Claims, 4 Drawing Sheets

(56) References Cited

U.S. PATENT DOCUMENTS

2008/0186418 A1  8/2008 Kim et al.
2009/0161035 A1  6/2009 Shao et al.
2010/0289771 A1* 11/2010 Nozawa ........................ 345/174

FOREIGN PATENT DOCUMENTS

| CN | 101441537 A | 5/2009 |
| CN | 101533167 A | 9/2009 |

* cited by examiner

TOUCH SCREEN AND MANUFACTURING METHOD

BACKGROUND

Embodiments of the present invention relate to a touch screen and a manufacturing method.

Figure 1:
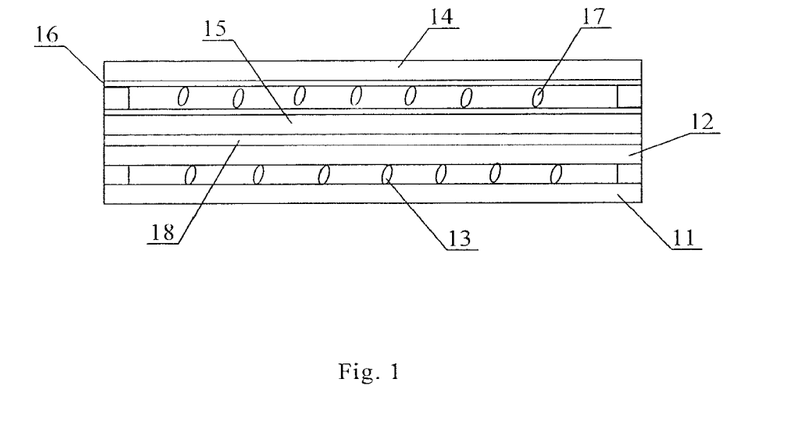
FIG. 1 is a structural view showing a conventional touch screen.

FIG. 1 is a structural view showing a conventional touch screen. In FIG. 1, a normal resistance type touch screen is shown as an example. This touch screen comprises a display unit for displaying and a touch unit for sensing a touch signal. The display unit comprises an array substrate 11, a color filter substrate 12 and a liquid crystal layer 13 sandwiched between the array substrate 11 and the color filter substrate 12. The touch unit comprises an upper substrate 14 and a lower substrate 15. An indium tin oxide (ITO) layer 16 is applied on the surface of the upper substrate 14 opposing to the lower substrate 15, and another ITO layer 16 is applied on the surface of the lower substrate 15 opposing to the upper substrate 14. Insulating particles 17 are filled between the two ITO layers to separate the upper substrate 14 and the lower substrate 15. The color filter substrate 12 and the lower substrate 15 are bonded together for example by optically clear adhesive (OCA) 18. Cover lenses are further attached on the upper substrate 14. When the touch unit is touched, the ITO layer of the upper substrate 14 and the ITO layer of the lower substrate 15 come into contact at the touched point. In this case, by respectively applying a voltage signal to the Y axis electrode on the lower substrate 14 and to the X axis electrode on the upper substrate 15, the voltage at the touched point is obtained based on the phenomenon that voltage drop occurs due to the contact resistance, and then the coordinates at the touched point can be determined. Since the touch screen has a four-layer structure comprising the array substrate, the color filter substrate, the lower substrate and the upper substrate as described above, the touch screen has the disadvantages of a large thickness and low light-transmittance. At present, the thickness of the touch screen is preferable to be decreased by decreasing the thicknesses of the substrates in the display unit and/or the touch unit or by replacing the cover lenses attached on the upper substrate with a polarizer sheet.

SUMMARY

According to an aspect of the invention, a touch screen is provided. The touch screen comprises a first substrate, a second substrate and a third substrate sequentially stacked. A first sensing layer is provided on a first surface of the second substrate opposing to the third substrate, and a second sensing layer is provided on a surface of the third substrate opposing to the second substrate. The second substrate provided with the first sensing layer and the third substrate provided with the second sensing layer constitute a touch unit for sensing a touch signal, and the second substrate and the first substrate constitute a display unit for displaying.

According to another aspect of the invention, a method of manufacturing a touch screen is provided. The method comprises: respectively preparing a first substrate, a second substrate and a third substrate, providing a first sensing layer on a first surface of the second substrate, and providing a second sensing layer on the third substrate; and sequentially stacking and assembling the first substrate, the second substrate and the third substrate so that the second substrate provided with the first sensing layer and the third substrate provided with the second sensing layer constitute a touch unit for sensing a touch signal, and the second substrate and the first substrate constitute a display unit for displaying.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

According to an embodiments, a color filter substrate in a display unit is integrated with a lower substrate in a touch unit, that is, the color filter substrate and the lower substrate are manufacture by one substrate (such as a glass substrate, a quartz substrate, a organic plastic substrate and the like), and thus a touch screen with three-layer structure can be obtained. Specifically, the touch screen with three-layer structure according to the embodiment comprises a first substrate, a second substrate and a third substrate. A first sensing layer is provided on a first surface of the second substrate opposing to the third substrate, a second sensing layer is provided on a surface of the third substrate opposing to the second substrate, and thus the second substrate and the third substrate constitute the touch unit for sensing the touch signal by the first sensing layer and the second sensing layer. In addition, the second substrate and the first substrate constitute the display unit for displaying.

The display unit constituted by the first substrate and the second substrate may be a liquid crystal display (LCD) unit, an organic light emitting display (OLED) unit and the like. For example, in the case of the LCD unit, a color filter structure may be provided on the second surface of the second substrate opposing to the first substrate, and alternatively, the color filter structure may be provided on the first substrate to obtain a color filter on array (COA) structure. Similarly, in the case of OLED unit, the color filter structure, if any, may be provided on the second surface of the second substrate or may be provided on the first substrate.

Hereinafter, embodiments of the invention will be described in detail with reference to the accompanying drawings.

Figure 2:
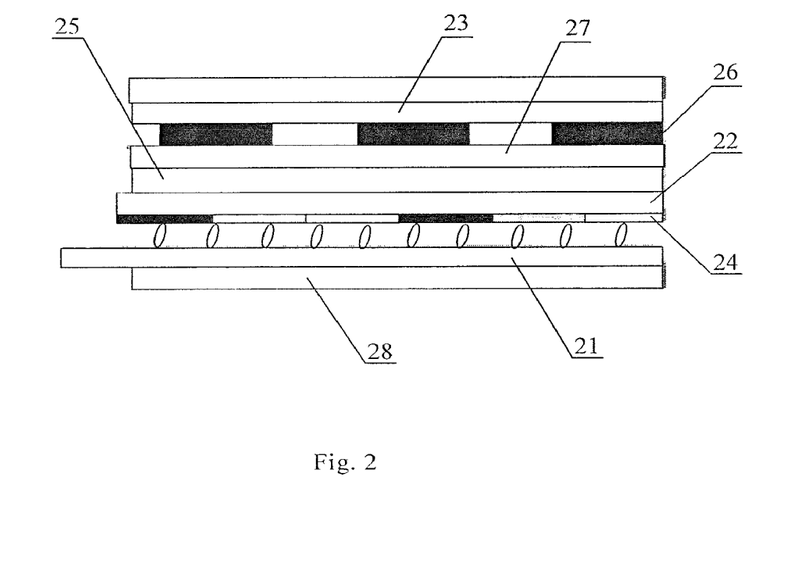
FIG. 2 is a structural view showing a first embodiment of a touch screen according to the invention.

FIG. 2 is a structural view showing a first embodiment of the touch screen according to the invention. In the first embodiment, a projective capacitive type (PCT) touch screen is exemplified. The PCT touch screen according to the first embodiment has the three-layer structure.

As shown in FIG. 2, the touch screen in this embodiment comprises a first substrate 21, a second substrate 22 and a third substrate 23. The first substrate 21 is a thin film transistor (TFT) array substrate and is provided with a TFT array comprising gate lines and data lines. The second substrate 22 comprises a first surface and a second surface; the first surface opposes to the third substrate 23 and is provided with a first sensing layer 25, and the second surface opposes to the first substrate 21 and is provided with a color filter structure 24. The second substrate 22 with the color filter structure 24 and the first substrate 21 constitute a display unit for displaying. The second sensing layer 26 is provided on the surface of the third substrate 23 opposing to the second substrate 22. Both the first sensing layer 25 and the second sensing layer 26 are capacitive type sensing layers. The second substrate 22 with the first sensing layer 25 and the third substrate 23 with the second sensing layer 26 constitute the capacitive type touch unit for sensing touch signals. An insulating layer 27 is provided between the first sensing layer 25 and the second sensing layer 26 to separate the first sensing layer 25 and the second sensing layer 26 away. In addition, two polarizer sheets 28 are provided above the third substrate 23 and below the first substrate 21, respectively. In this embodiment, when the touch screen is touch by an object such as a user's finger, an additional capacitance is formed between the user's finger and the capacitive type touch unit, and then the coordinates at the touched point of the user's finger are determined according to the current variation of the capacitive type touch unit. In another example, the insulating layer 27 can be replaced with insulating particles.

According to this embodiment, the lower substrate in the touch unit and the color filter substrate in the display unit are manufactured with one substrate, and thus the thickness of the touch screen can be greatly decreased and the light transmittance of the touch screen can be increased accordingly.

In addition, the touch screen in the first embodiment may be manufactured by the following steps.

Firstly, in Step 301, the first substrate, the second substrate and the third substrate are respectively prepared, the first sensing layer is provided on the first surface of the second substrate, the color filter structure is provided on the second surface of the second substrate, and the second sensing layer is provided on the third substrate.

Specifically, the first substrate is a TFT array substrate and is provided with the TFT array comprising gate lines and data lines. An ITO transparent conductive layer is deposited on the first surface of the second substrate and patterned to form the first sensing layer. A touch electrode for sensing a touch signal is provided in the first sensing layer. The color filter structure provide on the second surface of the second substrate comprises a red-green-blue (RGB) resin layer and the like. The second sensing layer is provided on the third substrate. Both the first sensing layer and the second sensing layer are the capacitive type sensing layers.

Next, in step 302, the first substrate, the second substrate and the third substrate are assembled together, and thus the second substrate with the color filter structure and the first substrate constitute the display unit for displaying, and the second substrate with the first sensing layer and the third substrate with the second sensing layer constitute the capacitive type touch unit for sensing the touch signal.

Then, the touch electrodes are connected to the external controlling circuit. The touch electrodes comprise the touch electrode provided in the first sensing layer and the touch electrode provided in the second sensing layer. The external controlling circuit is used to processing the touch signal to determine the coordinates of the touched point. For example, the touch electrodes provided in the first sensing layer and the second sensing layer are connected to the external controlling circuit with a flexible printed circuit (FPC).

In the touch screen manufactured as above, the lower substrate in the touch unit and the color filter substrate in the display unit are manufactured by one substrate, and thus the thickness of the touch screen can be greatly decreased and the light transmittance of the touch screen can be increased.

Hereinafter, a second embodiment of the touch screen according to the invention will be described. In the second embodiment, a four-line resistance type touch screen with a small size is exemplified. The resistance type touch screen in this embodiment has the three-layer structure as well. In an example of this embodiment, in order that the X axis signal and the Y axis signal are processed, at least four touch electrodes are connected to the external controlling circuit by a FPC as that in a conventional touch screen. For example, in the small-sized touch screen, the FPC connecting with the signal lines of the touch electrodes and the FPC connecting with the driving circuit of the first substrate are firstly manually bonded together and then connected to the external controlling circuit. In order to overcome the problems that the manual-bonding efficiency is low and short-circuit easily occurs due to low precision of the manual-bonding process, a substrate touch electrode is provided on the first substrate in another example of this embodiment. The substrate touch electrode on the first substrate opposes to a second touch electrode on the third substrate and is electrically connected with the second touch electrode through sealant. In this way, the substrate touch electrode and the substrate driving circuit on the first substrate can be simultaneously connected to the external controlling circuit by one FPC bonding process, and thus the signal line of the touch electrode and the driving circuit of the first substrate can be easily connected to the external controlling circuit. Therefore, the manufacture process can be simplified and the yield can be improved.

Figure 3:
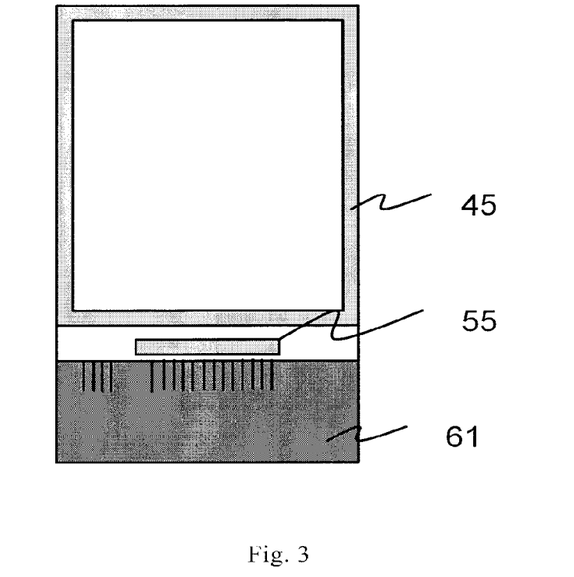
FIG. 3 is a structural view showing a second embodiment of the touch screen according to the invention.
Figure 4:
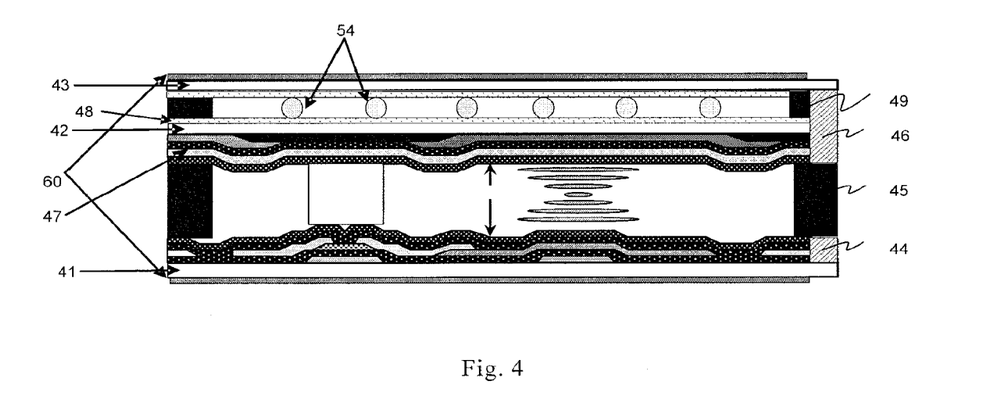
FIG. 4 is a sectional view of FIG. 3.
Figure 5:
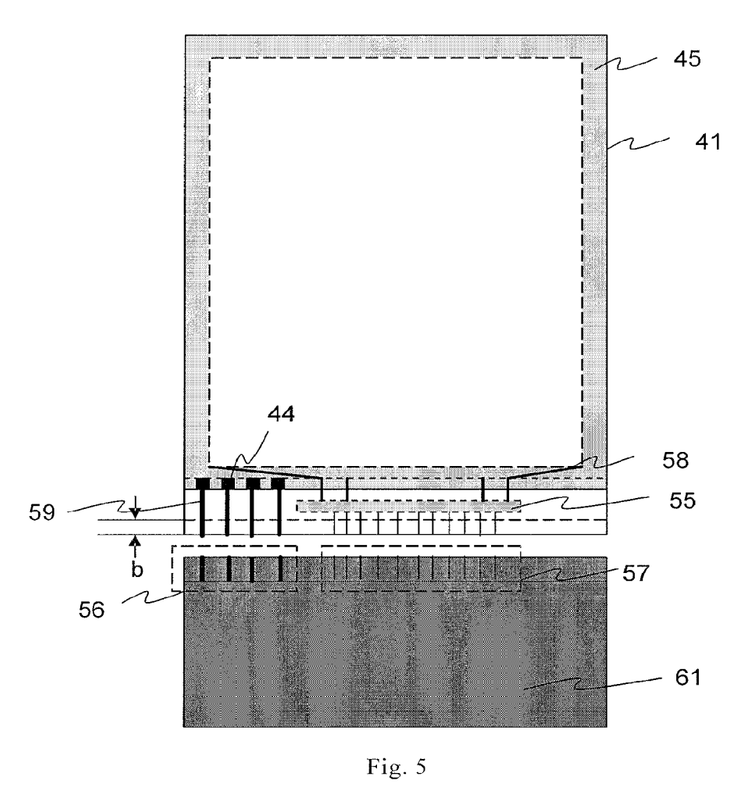
FIG. 5 is a structural view showing a first substrate in FIG. 4.
Figure 6:
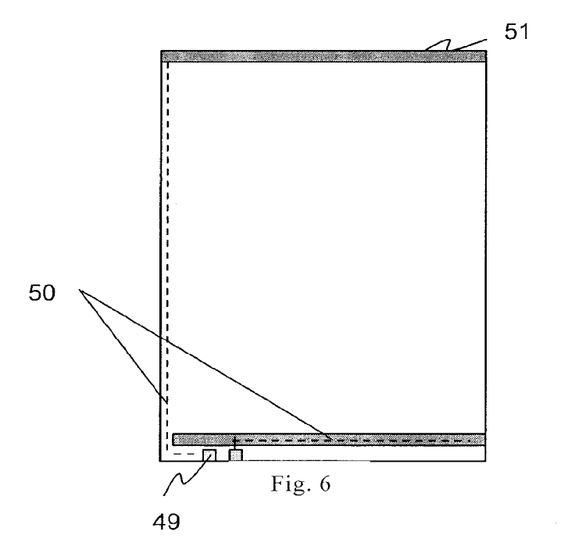
FIG. 6 is a structural view showing a second substrate in FIG. 4.
Figure 7:
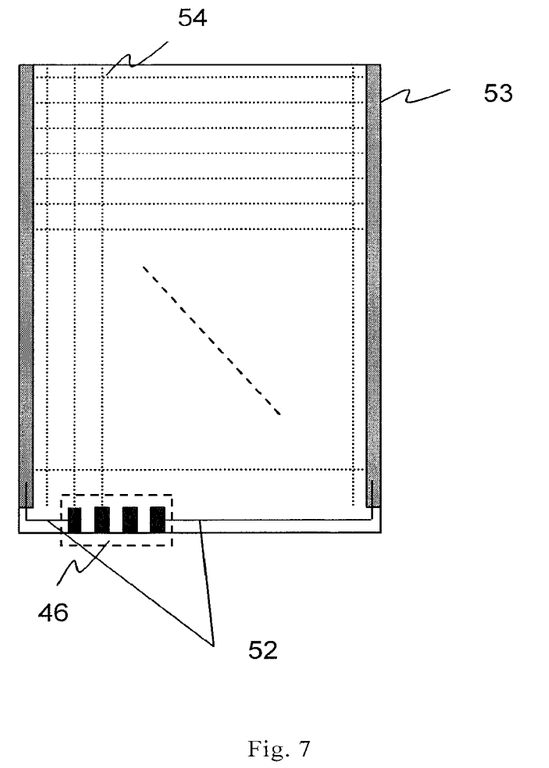
FIG. 7 is a structural view showing a third substrate in FIG. 4.

FIG. 3 is a structural view showing the second embodiment of the touch screen according to the invention, FIG. 4 is sectional view of FIG. 3, FIG. 5 is a structural view showing the first substrate in FIG. 4, FIG. 6 is a structural view showing the second substrate in FIG. 4; and FIG. 7 is a structural view showing the third substrate in FIG. 4. The touch screen in the second embodiment will be described in detail with reference to FIG. 3 to FIG. 7.

The touch screen in this embodiment comprises a first substrate 41, a second substrate 42 and a third substrate 43. The touch screen in this embodiment is different from that in the first embodiment in that the first sensing layer provided on the first surface of the second substrate 42 and the second sensing layer provided on the third substrate 43 are resistance type sensing layers, and thus the first sensing layer and the second sensing layer constitute a resistance type touch unit.

Specifically, the first substrate 41 is a TFT array substrate and comprises a TFT array comprising gate lines and data lines. The substrate touch electrodes 44 are further provided on the first substrate 41. The substrate touch electrodes 44 are provided within the width range of the sealant 45 and oppose to the second touch electrodes 46 on the third substrate 43. Sealant 45 is used to seal the first substrate 41 and the second substrate 42 and comprises conductive substance (such as conductive metal particles and the like). For example, the sealant 45 may be an anisotropic conductive adhesive. The second touch electrodes 46 and the substrate touch electrodes 44 are electrically connected with each other through the sealant 45. The second substrate 42 comprises the first surface and the second surface. The first surface opposes to the third substrate and is provided with the first sensing layer 48. The second surface opposes to the first substrate and is provided with the color filter structure 47. The color filter structure 47 may comprises a RGB resin layer, a common electrode, a black matrix, spacers and the like, for example. First touch electrodes 49 are provided in the first sensing layer 48. For example, in the four-line resistance type touch screen, two first touch electrodes 49 are provided in the first sensing layer, and the two first touch electrodes 49 respectively correspond to X'+ and X'−. Two first conductive adhesive strips 51 (i.e., conductive adhesive strips in the X axis direction) are respectively provided on both edges of the first conductive layer 48 in the longitudinal direction. The two first touch electrodes 49 are respectively connected with the two first conductive adhesive strips 51 through X axis metal wires 50. The X axis metal wires 50 are mainly used to apply the voltage signal generated by the first touch electrode 49 to the first conductive adhesive strips 51. The second sensing layer is provided on the third substrate 43. The second touch electrodes 46 are provided in the second sensing layer. For example, in this embodiment, four second touch electrodes 46 are provided, and the four second touch electrodes 46 respectively correspond to X+, X−, Y+ and Y−. Two second conductive adhesive strips 53 (i.e., conductive adhesive strips in the Y axis direction) are respectively provided on both edges of the third substrate 43 in the horizontal direction. The second touch electrodes 46 corresponding to Y+ and Y− are respectively connected with the two conductive adhesive strips 53 through Y axis metal wires 52. The Y axis metal wires 52 are mainly used to apply the voltage signal to the second conductive adhesive strips 53. In addition, the second touch electrodes 46 corresponding to X+ and X− are respectively connected with the first touch electrodes 49 corresponding to X'+ and X'− for example by silver adhesive, and thus the second substrate 42 and the third substrate 43 are connected with each other. The length of the second touch electrodes 46 is larger than that of the first touch electrodes 49. For example, the length of the second touch electrodes 46 may be two times of that of the first touch electrodes 49. In this way, one end of each second touch electrode 46 is provided on the third substrate 43, and the other end thereof is abutted on the sealant 45 so that the second touch electrode 46 can be electrically connected with the substrate touch electrode 44 through the sealant 45. In the touch screen with three-layer structure according to this embodiment, the first substrate 41 and the second substrate 42 with the color filter structure 47 constitute the display unit for displaying, and the third substrate 43 and the second substrate 42 constitute the touch unit for sensing the touch signal by the first sensing layer and the second sensing layer. Insulating particles 54 are provided between the third substrate 43 and the second substrate 42 to separate the third substrate 43 and the second substrate 42 away. In addition, the polarizer sheets can be respectively provided above the third substrate 43 and below the first substrate 41. In a normally-white LCD, the polarizer sheet 60 above the third substrate 43 and the polarizer sheet 60 below the first substrate 41 are provided to be perpendicular to each other in their polarization directions. In addition, the polarizer sheet 60 above the third substrate 43 may be used to protect the touch unit.

In addition, for example, only one driving chip (such as the substrate driving circuit 55 shown in FIG. 5) is provided to drive a small-sized touch screen. Both source signals and gate signals are provided by the substrate driving circuit 55. The gate signals may be input from two sides of the touch screen. For example, the driving signals for the gate lines in the odd rows may be input from the left side of the touch screen, and the driving signals for the gate lines in the even rows may be input from the right side of the touch screen. A gate connecting lines 58 are provided between the substrate driving circuit 55 and the corresponding gate lines of the touch screen to transfer the driving signals. The gate connecting lines 58 are provided below the sealant 45. As shown in FIG. 5, in this embodiment, the gate connecting lines 58 are provided behind the substrate touch electrodes 44 of the first substrate 41, and thus the provision of the substrate touch electrodes 44 has no influence on the provision of the gate connecting line 58. In addition, since the components for transferring and receiving the source signals is not changed, the substrate touch electrodes 44 have no influence on these components as well. Electrode wires 59 connected with the substrate touch electrodes 44 are provided at the edge of the first substrate 41 and within the bonding region b of the FPC 61. The side of the FPC 61 close to the touch screen comprises two regions, in which one region is a first attaching region 56 for electrically connecting with the substrate touch electrode 44, and the other region is a second attaching region 57 for electrically connecting with the substrate driving circuit 55. The substrate driving circuit 55 provides source signals and gate signals to the first substrate 41 so as to achieve the display function of the touch screen. The external controlling circuit is mainly used to supply the signals and voltages required by the substrate driving circuit 55. The width of the connecting wires in the first attaching region 56 is slightly larger than that in the second attaching region 57 so as to obtain a smaller resistance value, and thus the collection of the voltage signals can be secured. The side of the FPC 61 away from the touch screen is connected with the external driving circuit. In this embodiment, the FPC can provide the display signals to the display unit through the substrate driving circuit 55, the FPC can also provide the voltage signals to the touch unit by the substrate touch electrodes 44 of the first substrate 41 through the sealant 45 and the second touch electrodes 46, and thus the controls of the display unit and the touch unit can be simultaneously achieved.

In this embodiment, the touch screen may operate as follows, for example. When a driving voltage of 5 V and another voltage of 0 V are respectively applied to the second conductive adhesive strips on the third substrate 43, the driving voltage signals generated by the external driving circuit are transferred to the substrate touch electrodes 44 of the first substrate 41 by the electrode wires in the first attaching region 56 of the FPC 61 and then are transferred to the second conductive adhesive strips 53 of the third substrate through the sealant 45 and the second touch electrodes 46. The driving voltage signals are applied to the second conductive adhesive strips 53 by the two second touch electrodes 46 corresponding to Y+ and Y− through the Y axis metal wires 52. The driving voltage of 5V is applied to the second conductive adhesive strip 53 connected with the second touch electrode 46 corresponding to Y+, and the driving voltage of 0V is applied to the second conductive adhesive strip 53 connected with second touch electrode 46 corresponding to Y−. In addition, when the touch unit receives the touch signal, the first conductive adhesive strips 51 (i.e., the conductive adhesive strips in the X axis direction) of the second substrate 42 generate a voltage signal corresponding to the touch signal, and then the voltage signal corresponding to the touch signal is transferred to the external controlling circuit sequentially through the X axis metal wire 50, the first touch electrode 49, the second touch electrode 46, the sealant 45, the substrate touch electrode 44 and the FPC 61 so that the voltage signal corresponding to the touch signal is processed to obtain the X coordinate at the touched point. When a driving voltage of 5V and another driving voltage of 0 V are respectively applied to the first conductive adhesive strips 51 of the second substrate 42 and the voltage signal corresponding to the touch signal is generated by the second conductive adhesive strips 53 (i.e., the conductive adhesive strips in the Y axis direction) and processed by the external driving circuit, thus the Y coordinate at the touched point is obtained. In detecting the Y coordinate at the touched point, the application of the driving voltage signal and the achievement of the voltage signal corresponding to the touch signal are similar to those in detecting the X coordinate.

In this embodiment, the four-line resistance type touch screen with a small-size is shown only in an exemplary way. It should be noted that, the structure in this embodiment is applicable to the touch screen of a large size as well. In addition to the four-line resistance type touch screen, the structure in this embodiment may be applied to other type touch screens such as the capacitive type touch screen. In addition, various modifications, alterations or combination may be made based on the teaching of this embodiment. For example, the Y axis conductive adhesive strips may be provided on the second substrate, and the X axis conductive adhesive strips may be provided on the third substrate. In addition, the structure in this embodiment may be applied to the in-cell type touch screen, and thus the manufacture process can be simplified further.

According to this embodiment, the lower substrate in the touch unit and the color filter substrate in the display unit are integrated into one substrate, and thus the thickness of the touch screen can be greatly decreased and the light transmittance of the touch screen can be increased. In addition, in this embodiment, the substrate touch electrodes are provided on the first substrate and electrically connected with the second touch electrodes on the third substrate. In this way, the touch unit and the display unit can be simultaneously connected to the external controlling circuit by one bonding process through one FPC. Thus, the manufacture process can be simplified, the manufacture cost can be reduced and the yield can be improved.

In addition, the touch screen in the second embodiment may be manufactured by the following steps.

Firstly, in Step 701, the first substrate, the second substrate and the third substrate are respectively prepared, the first sensing layer is provided on the first surface of the second substrate, the color filter structure is provided on the second surface of the second substrate, and the second sensing layer is provided on the third substrate.

The first substrate is a TFT array substrate and is provided the substrate touch electrodes at the edge thereof. The substrate touch electrodes are connected with the external controlling circuit through the FPC. The process of forming the substrate touch electrode is not specifically limited. For example, the substrate touch electrodes may be formed together with the signal lines on the first substrate. The substrate touch electrodes are provided within the width range of the sealant and thus have no influence on the display quality. In addition, the substrate touch electrodes have no influence on the wirings provided on the first substrate. For example, in a small-sized touch screen driven by one driving circuit, the gate connecting lines are located below the sealant and provided on both sides of the touch screen. In addition, the gate connecting lines are further provided behind the substrate touch electrodes so that the gate connecting lines and the substrate touch electrodes do not interfere with each other. In addition, since the components for transferring and receiving the source signals are not changed, the substrate touch electrodes have no influence on these components as well.

In forming the second substrate, the ITO conductive film is deposited on the first surface of a base substrate (such as a glass substrate and the like) and then patterned to form the first sensing layer of the touch unit. The first sensing layer is a resistance type sensing layer. Then, the color filter structure may be formed on the second surface of the base substrate. After the formation of the second substrate is completed, the second surface thereof is provided with the color filter structure, and the first surface thereof is provided with the first sensing layer. In addition, the first touch electrodes, the voltage application wires connected with the first touch electrodes, the conductive adhesive strips and the like are provided in the first sensing layer. The first touch electrodes are used for connecting the second substrate with the third substrate and applying voltage signal to the second substrate. The conductive adhesive strips are connected with the voltage application wires and provided on two opposing edges of the first sensing layer. The voltage application wires are used to apply the voltage from the first touch electrodes to the conductive adhesive strips. In addition, when the touch screen receives a touch signal, the voltage application wires are used to output the voltage signal, which corresponds to the touch signal and is generated by the conductive adhesive strips, to the first touch electrodes. In this embodiment, two first touch electrodes are provided for example.

In forming the third substrate, the ITO conductive film is deposited on the surface of the base substrate (such as the glass substrate and the like) and then patterned to form the second sensing layer of the touch unit. The second sensing layer is a resistance type sensing layer also. In addition, the second touch electrodes, the voltage application wires, the conductive adhesive strips and the like are further provided in the second sensing layer. In addition, the third substrate is further provided with transparent insulating particles to separate the second substrate and the third substrate away. For example, 4096×4096 insulating particles may be uniformly distributed to separate the first sensing layer of the second substrate and the second sensing layer of the third substrate away.

Next, in Step 702, the first substrate, the second substrate and the third substrate are assembled together, and thus the second substrate and the first substrate constitute the display unit for displaying with the color filter structure, and the second substrate and the third substrate constitute the resistance type touch unit for sensing the touch signal with the first sensing layer and the second sensing layer.

Specifically, the first substrate, the second substrate and the third substrate are bonded together after the Step 701 is completed. The sealant containing conductive particles (for example silver adhesive) is used to seal the first substrate and the second substrate, and the substrate touch electrodes are provided below such sealant. In sealing the second substrate with the third substrate, the first touch electrodes of the second substrate are provided between the second substrate and the third substrate, the silver adhesive is applied on the first touch electrodes, and thus the first touch electrodes of the second substrate are electrically connected with the second touch electrodes of the third substrate through the silver adhesive so that the second substrate is connected with the third substrate. In addition, an insulating adhesive is employed to seal the second substrate and the third substrate to obtain the touch unit. After the second substrate and the third substrate are bonded together, one end of each second touch electrode is provided on the third substrate, the other end thereof is abutted on the sealant for sealing the first substrate with the second substrate, and thus the second touch electrode is electrically connected with the substrate touch electrode through this sealant. Both the substrate touch electrodes and the second touch electrodes are provided within the width range of the sealant for sealing the first substrate and the second substrate and thus have no influence on the display region.

After the first substrate, the second substrate and the third substrate are bonded together, the touch electrodes in the first sensing layer and the second sensing layer are connected with the external controlling circuit for processing the touch signal to obtain the coordinates of the touched point.

For example, in a small-sized touch screen, the electrode wires connected with the substrate touch electrodes are provided at the edge of the first substrate and within the bonding region b of the FPC. The side of the FPC close to the touch screen is the portion to be bonded with the touch screen, and the other side of the FPC away from the touch screen is the portion to be bonded with the external controlling circuit. The portion to be bonded with the touch screen comprises two regions, of which one region is the first attaching region for electrically connecting with the substrate touch electrodes, and the other region is the second attaching region for electrically connecting with the substrate driving circuit of the first substrate. The width of the connecting wires in the first attaching region is slightly larger than that in the second attaching region so as to obtain a smaller resistance value, and thus the collection of the voltage signal can be secured.

By the above steps, the touch unit and the display unit of the touch screen can be simultaneously connected to the external controlling circuit by one bonding process through one FPC. Thus, the manufacture process can be simplified, the manufacture cost can be reduced and the yield can be improved.

In the second embodiment of the touch screen, the second substrate may be manufactured by the following steps.

In Step 801, a transparent ITO conductive film is deposited on the first surface of the base substrate for forming the second substrate and then patterned to form the first sensing layer of the touch unit, the touch electrode for sensing the touch signal and the voltage application wire connected with the touch electrode are provided in the first sensing layer. For example, in a four-line resistance type touch screen, the first touch electrodes and the X axis metal wires are provided in the first sensing layer. After the touch electrodes and the metal wires are formed, a protecting layer such as a photoresist layer is coated on the first surface. The protecting layer is used to protect the first surface from being etched by acid or alkali or scratched in the subsequent process of forming the color filter structure.

Next, in Step 802, the color filter structure is provided on the second surface of the base substrate for forming the second substrate. The color filter structure may be manufactured by a conventional process.

Then, in Step 803, the protecting layer such as the photoresist layer is removed, and the conductive adhesive strips are attached to two opposing edges of the first surface and connected with the voltage application wire. For example, the first conductive adhesive strips in the X axis direction are provided on the two opposing edges of the first surface and connected with the X axis metal wires. After the Step 803, the second substrate with the first sensing layer on the first surface and with the color filter structure on the second surface is completed.

In addition to the photoresist layer, the protecting layer employed in the Step 801 may be formed by another material capable of protecting the first surface of the second substrate. The protecting layer is removed after the structures formed on the second surface are completed.

By the above-described steps, the lower substrate in the touch unit and the color filter substrate in the display unit are manufactured with one substrate, and thus the thickness of the touch screen can be greatly decreased and the light transmittance of the touch screen can be increased.

As described above, the color filter structure in the embodiments comprises a RGB resin layer, a common electrode, a black matrix, spacers and the like. However, in practice, a portion or the entirety of the color filter structure may be provided on the array substrate. Thus, the color filter structure in the invention may comprise any color filter structure obtained by the normal processes as long as the second substrate and the first substrate can constitute the display unit for displaying.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:
1. A method of manufacturing a touch screen comprising:
preparing a first substrate, a second substrate and a third substrate, respectively, providing a first sensing layer on a first surface of the second substrate, and providing a second sensing layer on the third substrate; and
sequentially stacking and assembling the first substrate, the second substrate and the third substrate so that the second substrate provided with the first sensing layer and the third substrate provided with the second sensing layer constitute a touch unit for sensing a touch signal, and the second substrate and the first substrate constitute a display unit for displaying, wherein
in forming the second substrate and the third substrate, the first sensing layer is formed on a first surface of a base substrate for forming the second substrate, the second sensing layer is formed on another base substrate for forming the third substrate,
the first sensing layer and the second sensing layer are resistance type sensing layers, and the touch unit constituted by the first sensing layer and the second sensing layer is a resistance type touch unit,
in forming the second substrate and the third substrate, a transparent conductive layer is coated on at least one of the first sensing layer and the second sensing layer and patterned to form a touch electrode for transferring the touch signal and a voltage application wire connected with the touch electrode,
the touch electrode comprises a first touch electrode provided in the first sensing layer and a second touch electrode provided in the second sensing layer, and
in forming the first substrate, a substrate touch electrode connected with an external controlling circuit is provided on the first substrate, and the touch signal is transferred to the external controlling circuit through the substrate touch electrode.
2. The method of manufacturing the touch screen according to claim 1, wherein conductive adhesive strips are respectively provided on two opposing edges of the at least one of the first sensing layer and the second sensing layer, and the conductive adhesive strip are connected with the voltage application wire.
3. The method of manufacturing the touch screen according to claim 1, wherein the substrate touch electrode is provided to oppose to the second touch electrode, and both the substrate touch electrode and the second touch electrode are provided within a width range of a sealant for sealing the first substrate and the second substrate.

4. The method of manufacturing the touch screen according to claim 1, wherein in assembling the first substrate, the second substrate and the third substrate, the first substrate and the second substrate are sealed by a sealant, the first touch electrode is electrically connected with the second touch electrode through conductive adhesive, and the second touch electrode is electrically connected with the substrate touch electrode through the sealant.

5. The method of manufacturing the touch screen according to claim 1, wherein a color filter structure is provided on a second surface of the second substrate opposing to the first substrate.

6. The method of manufacturing the touch screen according to claim 5, wherein the first substrate is an array substrate, the display unit constituted by the first substrate and the second substrate is a liquid crystal display unit.

7. A method of manufacturing a touch screen comprising:
preparing a first substrate, a second substrate and a third substrate, respectively, providing a first sensing layer on a first surface of the second substrate, and providing a second sensing layer on the third substrate; and
sequentially stacking and assembling the first substrate, the second substrate and the third substrate so that the second substrate provided with the first sensing layer and the third substrate provided with the second sensing layer constitute a touch unit for sensing a touch signal, and the second substrate and the first substrate constitute a display unit for displaying, wherein
in forming the second substrate and the third substrate, the first sensing layer is formed on a first surface of a base substrate for forming the second substrate, the second sensing layer is formed on another base substrate for forming the third substrate,
the first sensing layer and the second sensing layer are resistance type sensing layers, and the touch unit constituted by the first sensing layer and the second sensing layer is a resistance type touch unit,
in forming the second substrate and the third substrate, a transparent conductive layer is coated on at least one of the first sensing layer and the second sensing layer and patterned to form a touch electrode for transferring the touch signal and a voltage application wire connected with the touch electrode,
the touch electrode comprises a first touch electrode provided in the first sensing layer and a second touch electrode provided in the second sensing layer,
in forming the first substrate, a substrate touch electrode connected with an external controlling circuit is provided on the first substrate, and the touch signal is transferred to the external controlling circuit through the substrate touch electrode, and
the substrate touch electrode is provided within a width range of a sealant for sealing the first substrate and the second substrate.

8. The method of manufacturing the touch screen according to claim 7, wherein conductive adhesive strips are respectively provided on two opposing edges of the at least one of the first sensing layer and the second sensing layer, and the conductive adhesive strip are connected with the voltage application wire.

9. The method of manufacturing the touch screen according to claim 7, wherein the substrate touch electrode is provided to oppose to the second touch electrode, and both the substrate touch electrode and the second touch electrode are provided within the width range of the sealant for sealing the first substrate and the second substrate.

10. The method of manufacturing the touch screen according to claim 7, wherein in assembling the first substrate, the second substrate and the third substrate, the first substrate and the second substrate are sealed by the sealant, the first touch electrode is electrically connected with the second touch electrode through conductive adhesive, and the second touch electrode is electrically connected with the substrate touch electrode through the sealant.

11. The method of manufacturing the touch screen according to claim 7, wherein a color filter structure is provided on a second surface of the second substrate opposing to the first substrate.

12. The method of manufacturing the touch screen according to claim 11, wherein the first substrate is an array substrate, the display unit constituted by the first substrate and the second substrate is a liquid crystal display unit.

13. A method of manufacturing a touch screen comprising:
preparing a first substrate, a second substrate and a third substrate, respectively, providing a first sensing layer on a first surface of the second substrate, and providing a second sensing layer on the third substrate; and
sequentially stacking and assembling the first substrate, the second substrate and the third substrate so that the second substrate provided with the first sensing layer and the third substrate provided with the second sensing layer constitute a touch unit for sensing a touch signal, and the second substrate and the first substrate constitute a display unit for displaying, wherein
in forming the second substrate and the third substrate, the first sensing layer is formed on a first surface of a base substrate for forming the second substrate, the second sensing layer is formed on another base substrate for forming the third substrate,
the first sensing layer and the second sensing layer are resistance type sensing layers, and the touch unit constituted by the first sensing layer and the second sensing layer is a resistance type touch unit,
in forming the second substrate and the third substrate, a transparent conductive layer is coated on at least one of the first sensing layer and the second sensing layer and patterned to form a touch electrode for transferring the touch signal and a voltage application wire connected with the touch electrode,
the touch electrode comprises a first touch electrode provided in the first sensing layer and a second touch electrode provided in the second sensing layer,
in forming the first substrate, a substrate touch electrode connected with an external controlling circuit is provided on the first substrate, and the touch signal is transferred to the external controlling circuit through the substrate touch electrode, and
in assembling the first substrate, the second substrate and the third substrate, the first substrate and the second substrate are sealed by a sealant, the first touch electrode is electrically connected with the second touch electrode through conductive adhesive, and the second touch electrode is electrically connected with the substrate touch electrode through the sealant.

14. The method of manufacturing the touch screen according to claim 13, wherein conductive adhesive strips are respectively provided on two opposing edges of the at least one of the first sensing layer and the second sensing layer, and the conductive adhesive strip are connected with the voltage application wire.

15. The method of manufacturing the touch screen according to claim 13, wherein the substrate touch electrode is provided to oppose to the second touch electrode, and both the substrate touch electrode and the second touch electrode are provided within a width range of the sealant for sealing the first substrate and the second substrate.

16. The method of manufacturing the touch screen according to claim 13, wherein a color filter structure is provided on a second surface of the second substrate opposing to the first substrate.

17. The method of manufacturing the touch screen according to claim 16, wherein the first substrate is an array substrate, the display unit constituted by the first substrate and the second substrate is a liquid crystal display unit.

* * * * *